March 13, 1951   H. GUTTON   2,544,923
DEVICE INTENDED FOR THE TRANSMITTING OF ENERGY BY
MEANS OF A HOLLOW ELECTROMAGNETIC GUIDE
Filed July 19, 1946   2 Sheets—Sheet 1

Inventor
HENRI GUTTON
By Haseltine, Lake & Co.
Attorneys

March 13, 1951  H. GUTTON  2,544,923
DEVICE INTENDED FOR THE TRANSMITTING OF ENERGY BY
MEANS OF A HOLLOW ELECTROMAGNETIC GUIDE
Filed July 19, 1946  2 Sheets-Sheet 2
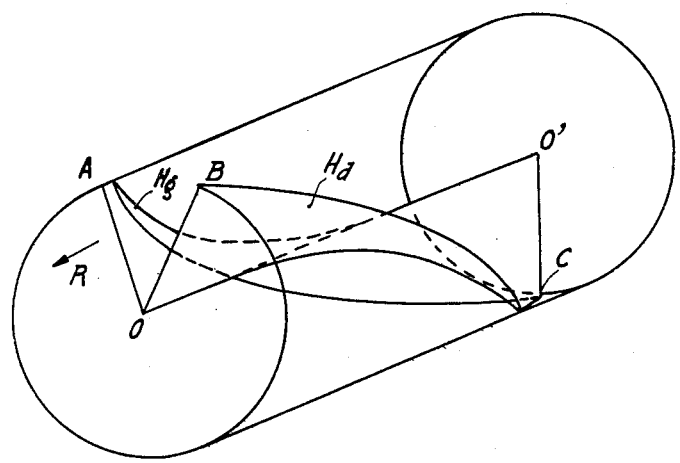
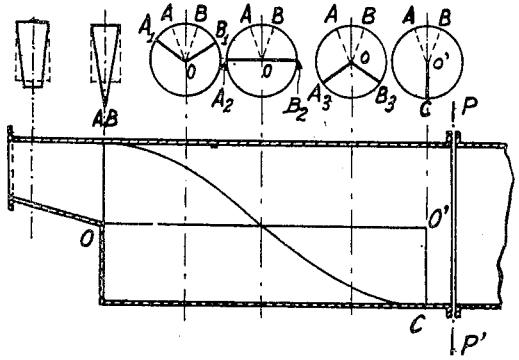
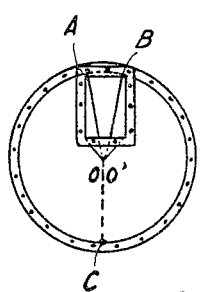
Inventor
HENRI GUTTON
By Haseltine, Lake & Co.
Attorneys Patented Mar. 13, 1951

2,544,923

UNITED STATES PATENT OFFICE 2,544,923

DEVICE INTENDED FOR THE TRANSMITTING OF ENERGY BY MEANS OF A HOLLOW ELECTROMAGNETIC GUIDE

Henri Gutton, Paris, France, assignor to Compagnie Generale de Telegraphie Sans Fil, a corporation of France Application July 19, 1946, Serial No. 684,817
In France May 7, 1942

Section 1, Public Law 690, August 8, 1946
Patent expires May 7, 1962

3 Claims. (Cl. 178—44)

This invention is relating to devices intended for the transmitting of energy by means of a hollow electromagnetic wave guide.

When a transmitter is coupled to a hollow electromagnetic wave guide in such manner as to excite a wave of the type $H_1$ in a cylindrical guide of revolution intended to feed an aerial, the problem arises as to how to supply the aerial without causing a reflection of the wave through a rotating joint which permits the orientation of the aerial in all directions.

Now the properties of a wave of the type $H_1$ do not permit the correct angular position of the transmitter in any direction. It is, however, an advantage to employ this type of wave since it is the only form of wave appreciably polarised and which is propagated in the interior of a guide in the form of a cylinder of revolution. Actually the electric vector at all the points of a diametrical plane Y—Y' is normal to this plane (Figure 1).

This form of wave lends itself best to the supply of a horn emitting a polarised wave. It has furthermore the property of transmitting the lowest frequencies in the interior of a cylindrical guide of given diameter, which enables tubes of comparatively smaller diameter to be employed.

The cut-off frequency is fixed by the ratio:

$$V_{min} = \frac{1.84 \times C}{2\pi R}$$

in which C is the velocity of the wave in free-space and R is the radius of the guide.

For any other type of wave the cut-off frequency is higher. For this reason, it is more economical and more practical to employ the form of wave $H_1$ to transmit energy at a distance, the losses being notably less than in a guide of rectangular section.

The length of wave $\lambda$ at the interior of the guide is defined by the equation:

$$\frac{1}{\lambda^2} = \frac{1}{\lambda_0^2} - \left(\frac{1.84}{2\pi R}\right)^2 \text{ with } \lambda_0 = \frac{2\pi C}{\omega}$$

$\lambda_0$ being the wavelength in free-space, $\lambda$ the wavelength in the guide and R the radius of the guide.

The present invention has for its object the provision of a system of wave guides with transformers which enable energy to be transmitted with change in the section of the guides and also the transmission of energy from a transmitter of short waves to a directional electromagnetic horn, without loss of energy by reflection and in which the wave produced by the transmitter is of the $H_1$ type.

Figure 8 is a perspective view of a metallic envelope juxtaposed to the envelope of Figure 7 to complete the transformation of $H_{01}$ waves into $H_0$ waves in a cylindrical wave guide.

Figure 9 is a longitudinal section corresponding to the view of Figure 8.

Figure 10 is a front view of the input opening of the devices of Figures 8 and 9 when juxtaposed.

Figure 2:
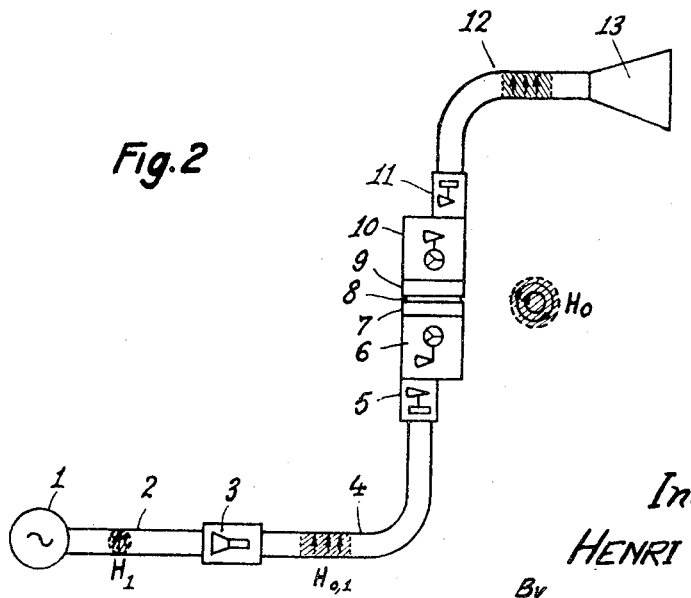
Figure 2 shows a wave guide system for the transmission of electromagnetic energy from an ultra-short wave generator to a rotating electromagnetic horn.

According to the present invention, a device for the conveyance of waves guided in hollow conduits comprises wholly or in part (Figure 2) the following elements:

In addition to a generator 1, a circular conduit 2 excited with waves of the $H_1$ type, and adaptation device 3 for passing from this circular conduit to a rectangular conduit 4 excited by $H_{01}$ wave, a second double adaptation device 5, 6 for passing from a rectangular conduit excited by wave $H_{01}$ to a circular conduit 7 excited by wave $H_0$, a rotating joint device 8 and finally a reverse adaptation device 10, 11 for passing from a circular conduit 9 excited by wave $H_0$ to a rectangular conduit 12 excited by wave $H_{01}$ and a directional electromagnetic horn 13 supplied by the conduit 12, the entire directional unit (9, 10, 11, 12, 13 reverse transformer, rectangular conduit and horn) being movable about the axis of the rotating joint 8.

The description given hereafter will more clearly indicate the means employed and the advantages which accrue.

Figure 1:
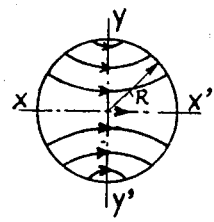
Figure 1 shows the electric force pattern for $H_1$ waves in a circular wave guide.
Figure 3:
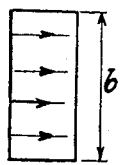
Figure 3 shows the electric force pattern for $H_{01}$ waves in a rectangular wave guide.

The adaptation of a circular guide in waves $H_1$ to a circular guide in waves $H_0$ is obtained by means of an intermediate rectangular guide in waves $H_{01}$, the electric vector of which remains constantly parallel to one of the sides of the guide (Figure 3). The dimension $b$ of the side of the guide normal to the lines of electric force is all that matters in the determination of the velocity of phase and the cut-off frequency:

$$V_{min} = \frac{C}{2b}$$

The length of wave $\lambda$ in the interior of the guide is fixed by:

$$\frac{1}{\lambda^2} = \frac{1}{\lambda_0^2} - \frac{1}{4b^2}$$

Figure 4:
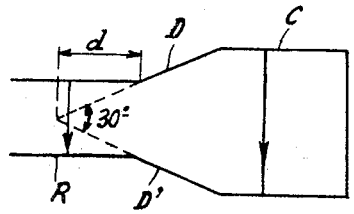
Figure 4 is the longitudinal section of a device for the transformation of $H_1$ waves in a cylindrical wave guide into $H_{01}$ waves in a rectangular wave guide.

The transformation of $H_1$ waves within the cylindrical wave guide without appreciable reflection is obtained, according to the invention, through a metallic hollow device represented by Figure 4. It has the form of a section of dihedron D—D' which intersects the cylindrical guide. Having an angle equal to or smaller than 30°, its edge is perpendicular to the electric vector of the $H_1$ wave and stands at a distance from its intersection with the rectangular wave guide which is at least equal to $$\frac{\lambda_g}{\pi}$$

where $\lambda_g$ is the wavelength in the guide.

The long transverse dimension $b$ of the rectangular guide normal to the electric vector must be related to the radius R of the cylindrical guide in such manner that the speed of propagation of the phase does not vary. This result is obtained if:

$$\frac{\pi}{b} = \frac{1.84}{R} \text{ or } b = \frac{\pi R}{1.84}$$

This transformer permits without loss of energy by reflection the adaptation of a guide of rectangular section into a guide of cylindrical section.

The wave $H_{01}$ thus produced must then be transformed into a wave capable of being guided without disturbance into a rotating conduit.

Now the magnetic wave $H_0$ and the electric wave $E_0$ in the interior of a cylindrical guide are the only types of symmetrical propagation with respect to an axis of revolution. Furthermore, the wave $H_0$ is the only form in respect of which the electric current in the direction of the guide has no component in the direction of propagation.

This latter property, added to the symmetry of revolution about the axis of the cylinder, permits, according to the invention, the passage of the wave from a fixed portion of an apparatus to a rotating portion under the best conditions.

Figure 5:
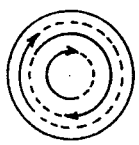
Figure 5 is the electric force pattern for $H_0$ waves in a circular wave guide.

The lines of force of the electric vector of the wave $H_0$ are circles in the plane of the cross-section of the guide (Figure 5). The electric field is nil in the vicinity of the wall or surface and of the axis of the cylinder. It is a maximum for a radius $\rho = 0.48R$.

The magnetic field is constantly normal to the electric field. Its component in the plane of the cross-section is radial, it is nullified on the axis of revolution and on the wall or surface and is a maximum for a radius $\rho = 0.48R$. Its component in the direction of propagation is a maximum on the axis of revolution, becomes nil on reversal for $\rho = 0.628R$ and acquires an amplitude equal to $0.403H_0$ on the surface of the cylinder, $H_0$ being the amplitude of the field on the axis.

The distribution of the magnetic field at the surface of the cylinder shows that the current which circulates on the wall has no component in the direction of propagation.

The length of wave of propagation $\lambda$ is defined by:

$$\frac{1}{\lambda^2} = \frac{1}{\lambda_0^2} - \left(\frac{3.83}{2\pi R}\right)^2$$

The wave $H_0$ in a cylindrical guide the axis of which coincides with the axis of rotation of the rotating entirety can thus pass through a rotating joint without using a metallic contact between the fixed part and the rotating part.

Figure 6:
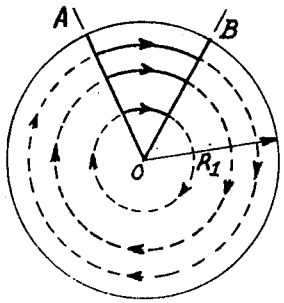
Figure 6 is the electric force pattern for $H_0$ waves in a circular wave guide provided with radial partitions.

According to the invention, the wave $H_{01}$ guided in a conduit of rectangular section is transformed progressively into a similar magnetic wave circulating in the interior of a sector of a cylinder of radius $R_1$. This wave can be considered as a fraction of a wave $H_0$ circulating in the interior of a cylinder of radius $R_1$. It is, in fact, possible without disturbing the propagation of the wave $H_{01}$ to cut the cylinder of radius $R_1$ by radial planes OA or OB (Figure 6).

The velocity of phase in the guide having for section the sector O—A—B is the same as in the cylinder of radius O—A or O—B.

On passing from the rectangular section to the section O—A—B the phase velocity remains constant if $R_1 = 1.22b$, $b$ being the dimension of the side of the rectangular conduit normal to the electric lines of force.

Figure 7:
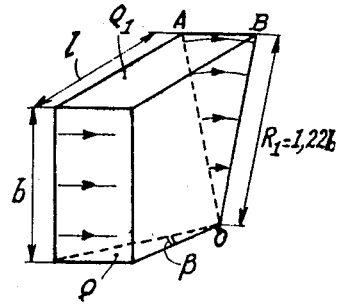
Figure 7 is a metallic envelope for the transformation of $H_{01}$ waves in a rectangular wave guide into $H_0$ waves in a sectoral section of a cylindrical wave guide.

According to the invention, there will be constituted, in order to effect this transformation, a wave transformer (Figure 7) having the form of a hollow solid of trapezoidal section, one of the bases Q of which decreases to zero at O, whilst the other $Q_1$ remains constant, and the height of which increases in the proportion of 1 to 1.22 from $b$ to $R_1 = 1.22b$.

The length $l$ of this transformer must be such that the angle $\beta$ of the triangle formed by the sides of the triangular base Q is less than 20° (approximately).

To cause the magnetic wave circulating in the interior of the sector A—O—B to become transformed into a wave $H_0$ circulating in the interior of the cylinder of radius $R_1$, there is constituted, according to the invention, another transformer (Figure 8) formed of a hollow cylindrical body comprising two interior pairs obtained by progressively separating the sides OA and OB until they merge together according to O'C (Figure 8). The geometrical positions of the straight lines OA and OB and two helicoids, $H_d$ to the right, and $H_g$ to the left, limited on the one hand by the axis of the cylinder, and on the other by the surface of the cylinder.

To avoid reflections at the inlet and at the outlet of the wave transformer of Figure 8, it is necessary that:

a. The intersection of the two helicoids $H_d$ and $H_g$ presumed to extend from the side R of the incident wave must be at a distance from the junction (that is to say from the plane A—O—B) greater than $$\frac{\lambda}{\pi}$$

b. The pitch of the helicoid must be at least equal to 6 times the radius of the cylinder.

These transformations lead to the formation of a wave $H_0$.

The guide after transformation may be interrupted without inconvenience on a cross-section of the cylinder; according to the invention, this property is employed to insert on this part the rotating joint constituted very simply by a short interruption beyond which commences the movable part of the apparatus.

In carrying the reverse transformation into effect, the wave $H_{01}$ is met with in the interior of a rectangular guide. This guide has in fact the property of best adapting itself to an electromagnetic horn of rectangular section. There is practically no reflection of the wave at the inlet of the horn if the angles of the two dihedrons formed by the opposite faces of the horn are each less than 30° and the distance from the virtual apex of these dihedrons to the junction section, greater than $$\frac{\lambda}{\pi}$$

This wave $H_{01}$ then excites the electromagnetic horn.

Figures 9 and 10 of the annexed drawing illustrate in longitudinal section and end view an example of embodiment of the whole of the transformers of the wave $H_{01}$ into wave $H_0$. The cross-sections of the transformer elements of the guides are shown at the different levels. The rotating joint is in the plane P—P'.

It is quite evident that the wave emitted by the transmitter is not necessarily of the type $H_1$ but may, for example, be of the type $H_{01}$. In this case, this wave may either be transformed directly into a wave $H_0$ of revolution by means of the transformers which have just been described, thus obviating the first adaptation device or this wave $H_0$ may be transformed into a wave $H_1$ and then this wave $H_1$ be retransformed into a wave $H_0$, polarised afresh and then the wave $H_{01}$ which is obtained be transformed into a wave $H_0$, permitting the employment of a rotating joint.

This double transformation of the wave $H_{01}$ into $H_{01}$ passing through the wave $H_1$ presents the advantage of being able to effect the transmission of the wave in the form of an $H_1$ wave in a cylindrical guide, which is advantageous as has been seen above in the case of connections at a great distance (economy, less loss, smaller diameters of the guides, etc.).

It is to be noted that a large number of combinations are possible for effecting the transmission of the waves, these combinations are naturally included in the scope of the invention from the fact that they are capable of being employed with the adaptation device or devices which have just been described in particular with a view to carrying into effect a rotation by any angle of the aerials without appreciably disturbing the waves to be transmitted.

What I claim is:

1. In a device for transmitting energy in the form of progressive electromagnetic ultra-short waves, from a wave generator to an electromagnetic horn, adapted to turn about a fixed axis, two identical extremities, in the form of rectangular wave guides designed to transmit only $H_{01}$ waves of a given wavelength in empty space, means coupling one of these wave guides to the generator and adapted to excite $H_{01}$ waves in its input section, a middle portion, composed of a cylindrical wave guide having a rotating joint, coaxial with the guide and coincident with the horn rotation axis, two wave transformers connecting this middle portion to the two extremities, the hollow transformers being identical metallic casings in reverse position relatively to each other in the direction of wave propagation, and means associated with each of the transformers and adapted to give thereto a gradually changing parallel cross-section, whereby the rectangular end section gradually merges into an isosceles triangular section, parallel to the rectangular one, and the triangular section gradually merges into a circle parallel to said triangle.

2. In a device according to claim 1, a wave transformer composed of two juxtaposed elements, communicating through an isosceles triangular opening and having the same plane of symmetry, bounded by a diameter of the circular end section, the bisectrix of the angle of the triangular opening facing the base of this triangle and the axis of symmetry of the rectangular end section parallel to its longer transverse dimension, the sections of said first element by a plane moving from the rectangular end section to the triangular one, while remaining parallel to said end section, being trapeziums having parallel corresponding bases in these planes, one of them keeping a constant length, while the other ones become smaller and smaller, the gradually diminishing bases forming an isosceles triangle, whose two equal sides form an angle smaller than 20° the two equal sides $R_1$ of the communication opening being related to the longer transverse dimension $b$ of the rectangular end section by the equation $$R_1 = 1.22b$$

the sections of said second element by the same moving plane, travelling in the same direction, beyond the triangular opening, being circular sectors having the same radius $R_1$, their bisectrices standing in the said symmetry plane and the apexes of their angles on a line perpendicular to said bisectrices, this angle increasing linearly with the distance of the moving plane from the triangular opening, till it becomes equal to 180°, the variation of this angle with that distance being such that the virtual intersection of the two partitions forming the sides of the sectoral sections, when extended beyond the triangular opening, is at a distance from this opening greater than $$\frac{\lambda g}{\pi}$$

where $\lambda g$ is the wavelength in either guide; the radius $R_1$ being such that the axial distance between the virtual and real intersections of the two partitions is at least equal to $3R_1$.

3. In a device as claimed in claim 1, a pyramidal electromagnetic horn, the angles of the two dihedrons formed by its opposite faces being less than 30° and the distance from the virtual edges of these dihedrons to the junction section of the horn being greater than $$\frac{\lambda g}{\pi}$$

where $\lambda g$ is the wavelength of the wave in the rectangular guide.

HENRI GUTTON.

REFERENCES CITED

The following references are of record in the file of this patent:

UNITED STATES PATENTS

| Number | Name | Date |
|---|---|---|
| 2,129,714 | Southworth | Sept. 13, 1938 |
| 2,253,503 | Bowen | Aug. 26, 1941 |
| 2,281,274 | Dallenbach | Apr. 28, 1942 |
| 2,403,289 | Korman | July 2, 1946 |
| 2,425,345 | Ring | Aug. 12, 1947 |